United States Patent
Khairmode et al.

(10) Patent No.: US 9,906,347 B2
(45) Date of Patent: Feb. 27, 2018

(54) METHOD AND SYSTEM FOR HYBRID AUTOMATIC REPEAT REQUEST OPERATION IN A SEMI-PERSISTENT SCHEDULING (SPS) INTERVAL

(71) Applicant: Samsung Electronics Co., Ltd., Gyeonggi-do (KR)

(72) Inventors: Vijay Shankar Khairmode, Bangalore (IN); Diwakar Sharma, Bangalore (IN)

(73) Assignee: Samsung Electronics Co, Ltd (KR)

( * ) Notice: Subject to any disclaimer, the term of this patent is extended or adjusted under 35 U.S.C. 154(b) by 289 days.

(21) Appl. No.: 14/822,481

(22) Filed: Aug. 10, 2015

(65) Prior Publication Data

US 2016/0302224 A1 Oct. 13, 2016

(30) Foreign Application Priority Data

Apr. 9, 2015 (IN) .......................... 1870/CHE/2015

(51) Int. Cl.
*H04W 72/12* (2009.01)
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1812* (2013.01); *H04L 1/1825* (2013.01); *H04L 1/1896* (2013.01); *H04L 1/1822* (2013.01); *H04W 72/04* (2013.01)

(58) Field of Classification Search
CPC ... H04L 5/0055; H04L 1/1812; H04L 1/1825; H04L 1/1896; H04L 1/1822; H04W 72/04
See application file for complete search history.

(56) References Cited

U.S. PATENT DOCUMENTS

| 8,595,579 | B2 | 11/2013 | Yang et al. | |
|---|---|---|---|---|
| 2013/0301582 | A1* | 11/2013 | Jiang | H04W 72/042 370/329 |
| 2014/0036856 | A1* | 2/2014 | Park | H04L 1/1671 370/329 |
| 2015/0131496 | A1* | 5/2015 | Han | H04W 28/08 370/280 |

FOREIGN PATENT DOCUMENTS

EP 2 695 449 2/2014

OTHER PUBLICATIONS

The 3G4G Blog:VoLTE—Semi-Persistent Scheduling (SPS) and TTI Bundling, 4G Americas paper '4G Mobile Broadband Evolution: 3GPP Release-10 and beyond, Tuesday Feb. 8, 2011.

* cited by examiner

*Primary Examiner* — Melvin C Marcelo
(74) *Attorney, Agent, or Firm* — The Farrell Law Firm, P.C.

(57) ABSTRACT

A method and a base station are provided for transmitting hybrid automatic repeat request (HARQ) packets. The method includes bundling a plurality of HARQ packets in a HARQ process in a semi-persistent scheduling (SPS) grant; and transmitting, to a user equipment (UE), the bundled plurality of HARQ packets in the HARQ process.

17 Claims, 11 Drawing Sheets

Application buffer status at time t3

Application buffer status at time t4

Application buffer status at time t5

Application buffer status at time t6

METHOD AND SYSTEM FOR HYBRID AUTOMATIC REPEAT REQUEST OPERATION IN A SEMI-PERSISTENT SCHEDULING (SPS) INTERVAL

PRIORITY

This application claims priority under 35 U.S.C. § 119(a) to an Indian Patent Application filed, which was filed in the Indian Property Office on Apr. 9, 2015 and assigned Ser. No. 1870/CHE/2015, the entire disclosure of which is incorporated herein by reference.

BACKGROUND

1. Technical Field of the Disclosure

The embodiments disclosed herein relate generally to wireless communications, and more particularly, to a mechanism of a hybrid automatic repeat request (HARQ) operation in a semi-persistent scheduling (SPS) interval.

2. Description of the Related Art

In current system deployment, the 3rd generation partnership project (3GPP) has placed substantial focus on minimizing power consumption in a connected mode of a wireless communication system. For example, multiple solutions like a connected mode discontinuous reception (DRX) and SPS solution has been proposed (3GPP TS 36.321). The connected mode DRX reduces power consumption by finding an optimal trade off to wake up a user equipment (UE) only when data is scheduled. Further, the connected mode DRX, when used in conjunction with SPS, provides additional gain and avoids waking up the UE to read a control channel for downlink/uplink (DL/UL) resource allocation, because the SPS pre-defines UL/DL assignment with an SPS interval.

SPS is also proposed to support a high capacity Voice over Internet Protocol (VoIP) with reasonable control signaling. A principle of SPS includes persistent scheduling for initial transmissions and dynamic scheduling for retransmissions. In DL semi persistent scheduling, e.g., in Long Term Evolution (LTE), an eNodeB (eNB) may activate SPS using a Downlink control indicator (DCI) format in a physical downlink common control channel (PDCCH). After SPS is activated, the eNB may configure pre-defined DL/UL grant for a UE, which may remain valid for the SPS interval. For example, there could be N instances of resource allocation within the SPS interval. The eNB can de-activate the SPS using DCI format-0 in the PDCCH (with a specific configuration).

As per the current operation mode of SPS, after SPS has been activated in DCI format-0 using a special configuration (ref), an SPS grant may be available at an SPS assignment location for the SPS interval.

After the SPS interval, a new SPS grant may be sent by the eNB.

As indicated above, SPS has been designed for a Voice over Long Term Evolution (VOLTE) kind of operation, where a data requirement is generally known beforehand and remains constant, as per system design. In such cases, the SPS grant occurs at assigned instances for a given interval. However, current systems does not consider UE capability, where a UE can delay reading a DL SPS grant and can still have no impact on user experience. In most small cell deployment, a cell is heavily loaded and re-usability of available spectrum may add another dimension of power optimization, i.e., an eNB can send multiple grants to a UE, until UE does not send an acknowledgement/negative acknowledgement (ACK/NACK).

While the SPS and the connected mode DRX solutions provide substantial savings in power consumption, the SPS operation does not utilize the possibility of extending the UE sleep period, at the cost of extra resource allocation to the UE; especially, for small cell deployment, where full spectrum is available for a limited set of users and eventually underutilized.

SUMMARY

Accordingly, an aspect of the present disclosure is to provide a sub-optimal solution from a perspective of UE power consumption.

Another aspect of the present disclosure is to provide a method and system to leverage UE capability and dynamically enhance the connected mode DRX operation.

Another aspect of the present disclosure is to provide a method of bundling a plurality of HARQ packets in a HARQ process in an SPS grant.

Another aspect of the present disclosure is to provide a method of receiving, by a UE, bundled HARQ packets in a HARQ process in an SPS grant from a base station.

Another aspect of the present disclosure is to provide a method to allocate a downlink SPS grant to a group of UEs and a plurality of HARQ packets to the group of UEs within an interval of a downlink SPS grant.

Another aspect of the present disclosure is to provide a method of a UE for sending, to a base station, a buffer status indication that informs the base station to schedule a downlink resource allocation in an SPS grant.

Another aspect of the present disclosure is to provide a method of a base station for receiving, from a UE, a buffer status indication that indicates an availability of a UE buffer to receive downlink packets.

In accordance with an aspect of the present disclosure, a method is provided for a HARQ operation in an SPS interval in a same SPS grant. The method includes bundling a plurality of HARQ packets in a HARQ process in a semi-persistent scheduling (SPS) grant; and transmitting, to a user equipment (UE), the bundled plurality of HARQ packets in the HARQ process.

In accordance with another aspect of the present disclosure, a method is provided for a base station to allocate at least one of a downlink SPS grant to at least one group of UEs, and a plurality of HARQ packets to a group of UEs within an interval of downlink SPS grant.

In accordance with another aspect of the present disclosure, a method is provided for a UE to receive HARQ packets. The method includes receiving, from a base station, a bundled plurality of HARQ packets for a HARQ process in a semi-persistent scheduling (SPS) grant; and transmitting, to the base station, a response to the bundled plurality of HARQ packets, wherein said response indicates one of an acknowledgement and negative acknowledgement.

In accordance with another aspect of the present disclosure, a method is provided for sending a buffer status by a UE. The method includes generating a buffer status indication that informs a base station to schedule a downlink resource allocation in a semi-persistent scheduling (SPS) grant; and transmitting the buffer status indication to the base station.

In accordance with another aspect of the present disclosure, a method is provided for packet transmission by a base station. The method includes receiving, from a user equipment (UE), a buffer status indication that indicates an availability of a buffer of the UE to receive downlink packets in a downlink resource allocation; determining if the buffer of the is available to receive the downlink packets; and transmitting the downlink packets in an interval of a semi-persistent scheduling (SPS) grant, in response to determining that the buffer of the UE is available to receive the downlink packets.

In accordance with another aspect of the present disclosure, a base station is provided, which includes a processor configured to bundle a plurality of hybrid automatic repeat request (HARQ) packets in a HARQ process in a semi-persistent scheduling (SPS) grant; and a transceiver configured to transmit, to a user equipment (UE), the bundled plurality of HARQ packets in the HARQ process.

In accordance with another aspect of the present disclosure, a UE is provided, which includes a transceiver configured to receive a bundled plurality of hybrid automatic repeat request (HARQ) packets for a HARQ process in a semi-persistent scheduling (SPS) grant from a base station; and a processor configured to send, to the base station, via the transceiver, a response to the bundled plurality of HARQ packets. The response indicates one of an acknowledgement and negative acknowledgement.

In accordance with another aspect of the present disclosure, a base station is provided, which includes a processor configured to allocate a downlink semi-persistent scheduling (SPS) grant to a group of user equipments (UEs), and allocate a plurality of HARQ packets to the group of UEs within an interval of the downlink SPS grant; and a transceiver configured to transmit the allocated downlink SPS grant and said the allocated plurality of HARQ packets to the group of UEs.

In accordance with another aspect of the present disclosure, a UE is provided, which includes a processor configured to generate a buffer status indication that informs a base station to schedule a downlink resource allocation in a semi-persistent scheduling (SPS) grant; and a transceiver configured to transmit the buffer status indication to the base station.

In accordance with another aspect of the present disclosure, a base station is provided, which includes a transceiver configured to receive, from a user equipment (UE), a buffer status indication that indicates availability of a buffer of the UE to receive downlink packets in a downlink resource allocation; and a processor configured to determine whether the buffer of the UE is available to receive the downlink packets, and transmit the downlink packets in an interval of a semi-persistent scheduling (SPS) grant, in response to determining that the buffer of the UE is available to receive the downlink packets.

Accordingly, a method is provided, which is implemented in a UE, that sends a buffer status indication to a base station. The buffer status indication informs the base station to schedule a downlink resource allocation in a SPS grant.

BRIEF DESCRIPTION OF THE DRAWINGS

The above and other aspects, features, and advantages of certain embodiments of the present disclosure will become more apparent from the following detailed description when taken in conjunction with accompanying drawings in which.

DETAILED DESCRIPTION OF EMBODIMENTS

Figure 1A:
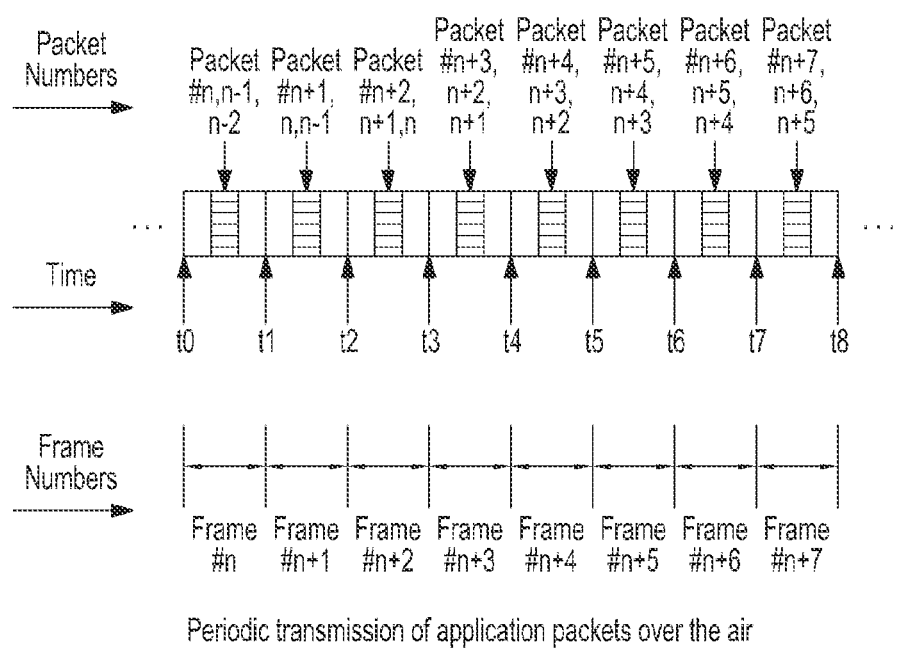
FIG. 1A illustrates periodic transmission of application packets, according to an embodiments of the present disclosure.

Various embodiments of the present disclosure are described in detail with reference to the accompanying drawings. The same or similar components may be designated by the same or similar reference numerals, although they are illustrated in different drawings. Additionally, detailed descriptions of constructions and/or processes, which are known in the art, may be omitted to avoid obscuring the subject matter of the present disclosure.

Herein, reference may be made to "an", "one", or "some" embodiment(s). This does not necessarily imply that each such reference is to the same embodiment(s), or that the feature only applies to a single embodiment. Single features of different embodiments may also be combined to provide other embodiments.

As used herein, the singular forms "a", "an", and "the" are intended to include the plural forms as well, unless expressly stated otherwise. It will be further understood that the terms "includes", "comprises", "including", and/or "comprising", when used herein, specify the presence of stated features, integers, steps, operations, elements, components, etc., but do not preclude the presence or addition of one or more other features integers, steps, operations, elements, components, and/or groups thereof.

As used herein, the term "and/or" includes any and all combinations and arrangements of one or more of the associated listed items.

Unless otherwise defined, all terms (including technical and scientific terms) used herein have the same meanings as commonly understood by one of ordinary skill in the art to which this disclosure pertains. It will be further understood that terms, such as those defined in commonly used dictionaries, should be interpreted as having meanings that are consistent with their meanings in the context of the relevant art, and should not be interpreted in an idealized or overly formal sense, unless expressly so defined herein.

Throughout the description, the terms base station, eNodeB, and eNB are used interchangeably.

The embodiments herein provide a method and apparatus of a base station for bundling a plurality of HARQ packets in a HARQ process in an SPS grant. For example, the method includes transmitting the plurality of bundled HARQ packets in the HARQ process to a UE, receiving, from the UE, a response to the transmitted plurality of bundled HARQ packets, determining whether the response indicates an acknowledgement (ACK) or negative acknowledgement (NACK), and in the case of the NACK, re-transmitting the plurality of bundled HARQ packets to the UE.

The embodiments herein provide a method and apparatus of a UE for receiving, from a base station, a bundled plurality of HARQ packets for a HARQ process in an SPS grant, and sending a response for the bundled plurality of HARQ packets to the base station. The response indicates an ACK or a NACK.

The embodiments herein provide a method for a base station to allocate a downlink SPS grant to a group of UEs, and a plurality of HARQ packets to the group of UEs within an interval of the downlink SPS grant. The method includes assigning the downlink SPS grant to the group of UEs, and the plurality of HARQ packets to the group of UEs.

In accordance with an embodiment of the present disclosure, a downlink SPS grant is allocated in an SPS physical downlink control channel (SPS_PDCCH) to a group of UEs.

In accordance with an embodiment of the present disclosure, a plurality of HARQ packets is allocated in an SPS_PDCCH to a group of UEs.

In accordance with an embodiment of the present disclosure, an downlink SPS grant and a plurality of HARQ packets for an interval include a resource allocation, a modulation and coding scheme (MCS), and link parameters for each of a plurality of UEs.

In accordance with an embodiment of the present disclosure, a downlink SPS grant for each UE is different. A summation of SPS grants is less than an SPS grant allocated to a group of UEs for an MCS and link parameters for each UE for an interval.

In accordance with an embodiment of the present disclosure, a plurality of UEs in a group is allocated with a Cell Radio Network Temporary Identifier (C_RNTI), which is valid until a downlink SPS grant allocation to the group of UEs is deactivated.

In accordance with an embodiment of the present disclosure, a downlink SPS grant allocation to a group of UEs and a plurality of HARQ packets to the group of UEs are deactivated by a DCI format in an SPS_PDCCH.

The embodiments herein provide a method of a UE for sending, to a base station, a buffer status indication that informs the base station to schedule a downlink resource allocation in an SPS grant.

In accordance with an embodiment of the present disclosure, a buffer status indication indicates an availability of a buffer to receive downlink packets in a downlink resource allocation.

The embodiments herein provide a method for a base station to receive, from a UE, a buffer status indication that indicates the availability of a UE buffer to receive downlink packets in a downlink resource allocation, determining whether the buffer is available to receive the downlink packets, and sending the downlink packets in an interval of an SPS grant.

Unlike conventional systems, the methods and apparatuses described herein leverage a UE's buffering of an application in order to process a voice packet. The method is adaptive to receive DL grants as per the state of UE's buffer.

Additionally, a method described herein provides flexibility to a UE, enhances a connected mode DRX sleep period, and optimizes system performance in order to minimize UE power consumption. For example, enhancement of the connected mode DRX sleep period is achieved by the UE reading transmitted HARQ packets from an eNB, as per UE capability, and enhances the sleep period based on the UE discretion. Basically, a method described herein leverages the UE capability for the purpose of power saving.

FIG. 1A illustrates periodic transmission of application packets, according to an embodiment of the present disclosure.

Referring to FIG. 1A, a flow of data packets is provided for a real time periodic service like a voice over IP call or a video call. The data packets are periodically transmitted by a base station, one packet per frame.

For example, for voice, one voice packet is typically transmitted every 20 ms. The packet jitter (i.e., variation in the packet delay) handled at UE by buffering packets in a jitter buffer in a process called de-jittering. Due to the de-jittering, a packet received at a UE is played a few frames (e.g., 3 frames) later.

For example, after de-jittering, a packet #n is played in a frame that starts at time t4 and ends at time t5, even though packet was received at UE by time t1. Conventionally, the UE has to wake up and receive the data packets during every frame. However, in accordance with an embodiment of the present disclosure, a method is provided, which utilizes the delay introduced by de-jittering process to the advantage of the UE in order to reduce battery power consumption.

Figure 1B:
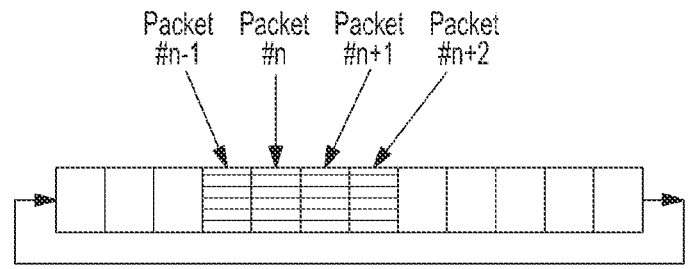
FIG. 1B illustrates application buffer status, according to an embodiment of the present disclosure.
Figure 1B:
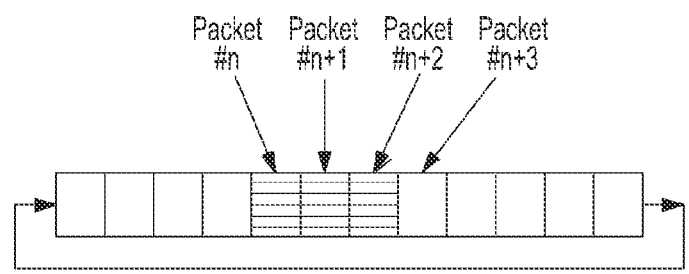
Figure 1B:
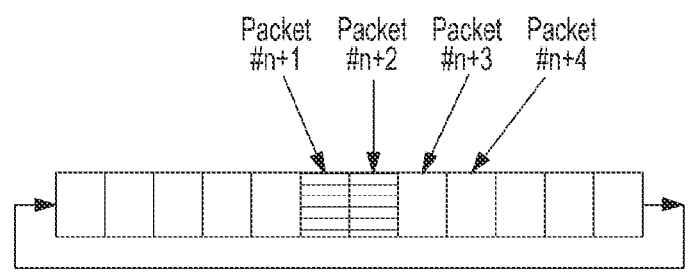
Figure 1B:
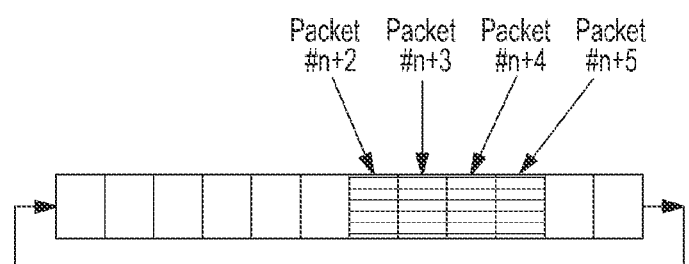
Figure 1C:
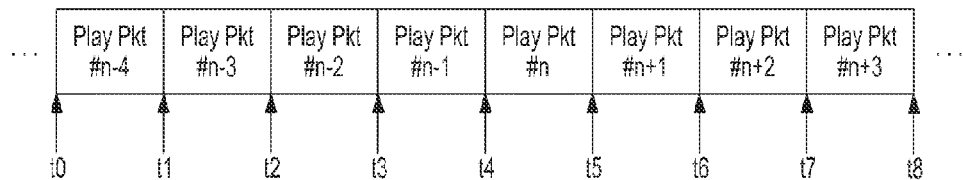
FIG. 1C illustrates play out timing of application packets, according to an embodiment of the present disclosure.

FIG. 1B illustrates application buffer status, according to an embodiment of the present disclosure, and FIG. 1C illustrates play out timing of application packets, according to an embodiment of the present disclosure.

As illustrated in FIGS. 1A and 1B, the base station sends n packets per frame (where n is 3 is this example). These n packets correspond to the packet meant for the current frame and packets generated in previous n−1 and n−2 frames. For example, in the nth frame, packets n, n−1, and n−2 are bundled and transmitted. In the next frame, packets n−1, n, and n+1 are bundled and transmitted. This procedure then continues for the next 6 frames.

In accordance with an embodiment of the present disclosure, the UE wakes up every 3rd frame to receive packets and receives 3 packets in that frame. The UE still has a packet to play for every frame as in the earlier case. The UE's modem (e.g., a radio frequency (RF), baseband part) now sleeps 2 frames per every 3 frames, which reduces battery power drain, as illustrated in the FIG. 1C.

The voice packet generation and processing at 20 ms is an ideal system design. However, in practice, even a 60 ms packet delay does not contribute the packet error. However, in a simulation, it can be seen that >80 ms processing delay will show 30% to 60% of error in voice packets due to a processing limitation of a jitter buffer. However, errors in 60% of the voice packets still means that 40% of the voice packets have been successfully decoded. Accordingly, a UE should be able to receive a packet, as per its capability, without any errors in the voice packets, while optimizing the connected mode DRX sleep.

In accordance with an embodiment of the present disclosure, a method is provided, which leverages UE capability and dynamically enhances a connected mode DRX operation by allowing the UE to ignore DL grants, as the same grant may be repeated until either an eNB listens to an ACK/NACK from the UE or a predefined maximum number of transmission time intervals has passed. The packets are buffered until they are received by the UE.

In accordance with another embodiment of the present disclosure, a method is provided for performing two way communication between a UE and an eNB, where the UE may explicitly request new packets from the eNB (not as uplink grant), by sending an indication that the UE is available to process additional packets, e.g., voice MAC packets.

Figure 2:
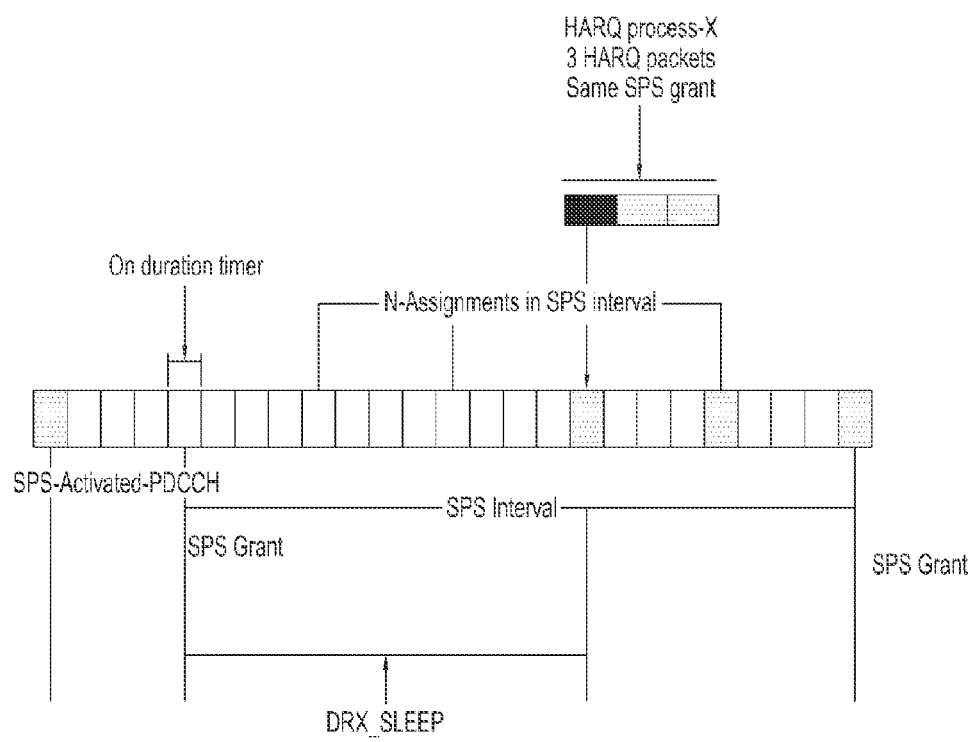
FIG. 2 illustrates a semi persistent DL scheduling with a HARQ packet bundling to enhance DRX sleep, according to an embodiment of the present disclosure.

FIG. 2 illustrates a semi persistent DL scheduling with a HARQ packet bundling for enhancing DRX sleep, according to an embodiment of the present disclosure.

As described above, in conventional LTE system design, a UE may wake up based on an on-duration timer and find a PDCCH for an assigned SPS DL grant, which may remain valid for N predefined instances for an SPS interval. However, as illustrated in FIG. 2, a UE may not wake up until an internal jitter buffer can handle the existing allocated resources, without degrading the user experience. In such cases, the UE can defer to read an SPS DL grant at an assigned instance in the SPS interval. Because the UE can defer reading an SPS grant, an eNB should refrain from repeating the DL grant until the UE reads the DL grant and the eNB receives an ACK/NACK for the allocated resources. When the SPS DL grant is allocated to the UE, the UE may defer and not to read a PDSCH, based on the UE capability, without sending an ACK/NACK for the HARQ packet. However, this may place constraints on the system design, where additional protection is required to handle the UE ACK HARQ packet. According to the method described herein, the eNB may keep transmitting a HARQ packets until they are read by the UE, and the UE may send either an ACK or a NACK to the eNB, after reading the HARQ packets.

In accordance with an embodiment of the present disclosure, a UE may wake up and read all pending HARQ packets, whenever it reads the HARQ process at the PDSCH.

Figure 3:
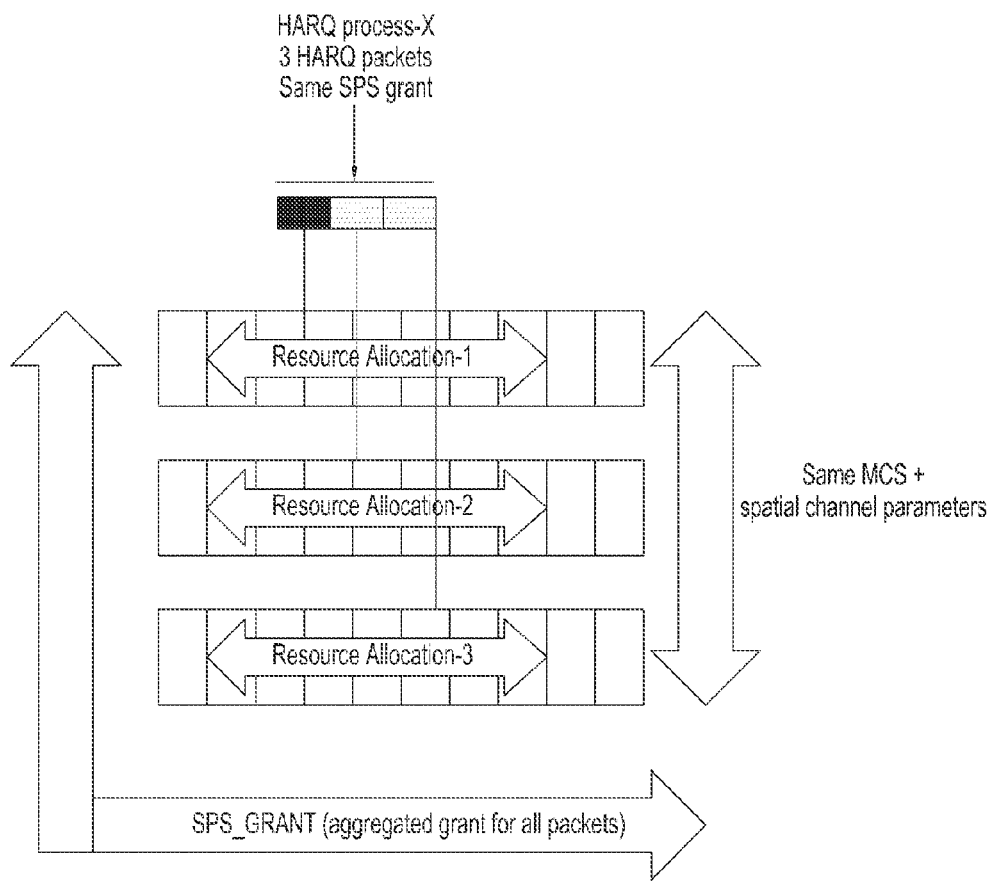
FIG. 3 illustrates an aggregated grant and resource allocation for a HARQ packet in a HARQ process, according to an embodiment of the present disclosure.

FIG. 3 illustrates an aggregated grant and resource allocation for a HARQ packet in a HARQ process, according to an embodiment of the present disclosure. In FIG. 3, a single HARQ process is associated multiple HARQ packets.

Referring to FIG. 3, the HARQ process-x includes 3 HARQ packets bundled in a same SPS grant. Here, only aggregated ACK/NACKs may be sent for a given HARQ process, i.e., an eNB is allowed to send HARQ packets to the UE without receiving an ACK/NACK for a given HARQ process. However, after reading a PDSCH for an SPS grant, the UE may send a single ACK/NACK to the eNB. This method is easier to implement for the SPS grant. To handle a dynamic grant for a single HARQ process and multiple packets the method may utilize the same resource allocation, MCS, and related spatial channel parameters.

Figure 4:
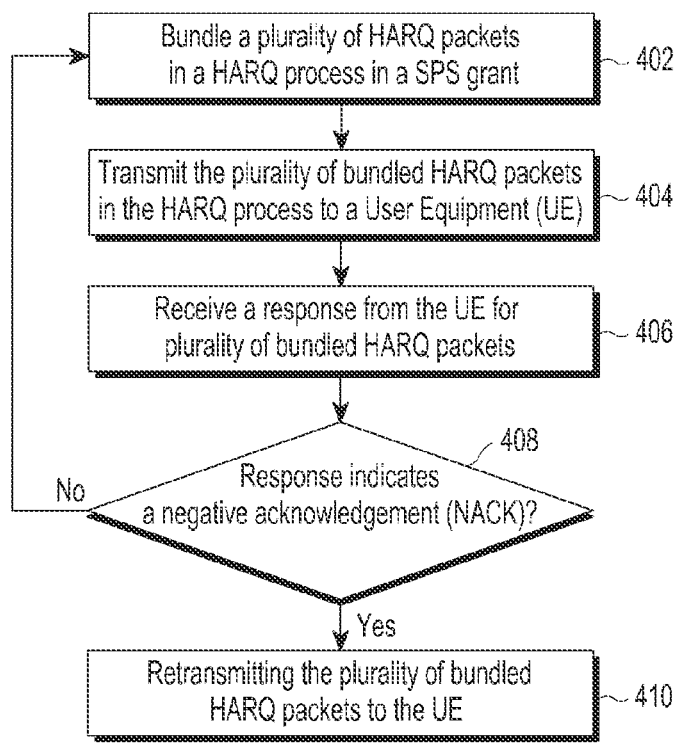
FIG. 4 is a flow diagram illustrating a method of a base station for transmitting and retransmitting a bundled plurality of HARQ packets for a HARQ process, according to an embodiment of the present disclosure.

FIG. 4 is a flow diagram illustrating a method of a base station for transmitting and retransmitting a bundled plurality of HARQ packets for a HARQ process, according to an embodiment of the present disclosure.

Referring to FIG. 4, in step 402, the base station (or eNB) bundles a plurality of HARQ packets in a HARQ process in an SPS grant.

In step 404, the eNB transmits the plurality of bundled HARQ packets in the HARQ process to the UE.

In step 406, the eNB receives, from the UE, a response to the transmitted plurality of bundled HARQ packets.

In step 408, the eNB determines if the response indicates a NACK.

In response to determining that the response indicates the NACK, the eNB retransmits the plurality of bundled HARQ packets to the UE in step 410.

However, in response to determining that the response does not indicate a NACK (such that it indicates an ACK), then the eNB generates and transmits bundled HARQ packets in next HARQ process to the UE.

Although not illustrated in FIG. 4, the method may also include determining whether an SPS interval of the SPS grant is reached. For example, in response to determining that the SPS interval of the SPS grant is reached, the eNB may retransmit the plurality of bundled HARQ packets in a consecutive SPS grant.

The various steps illustrated in FIG. 4 may be performed in the order presented, in a different order, or simultaneously. Further, in alternative embodiments, some steps may be omitted, added, modified, skipped, etc., without departing from the scope thereof.

Figure 5:
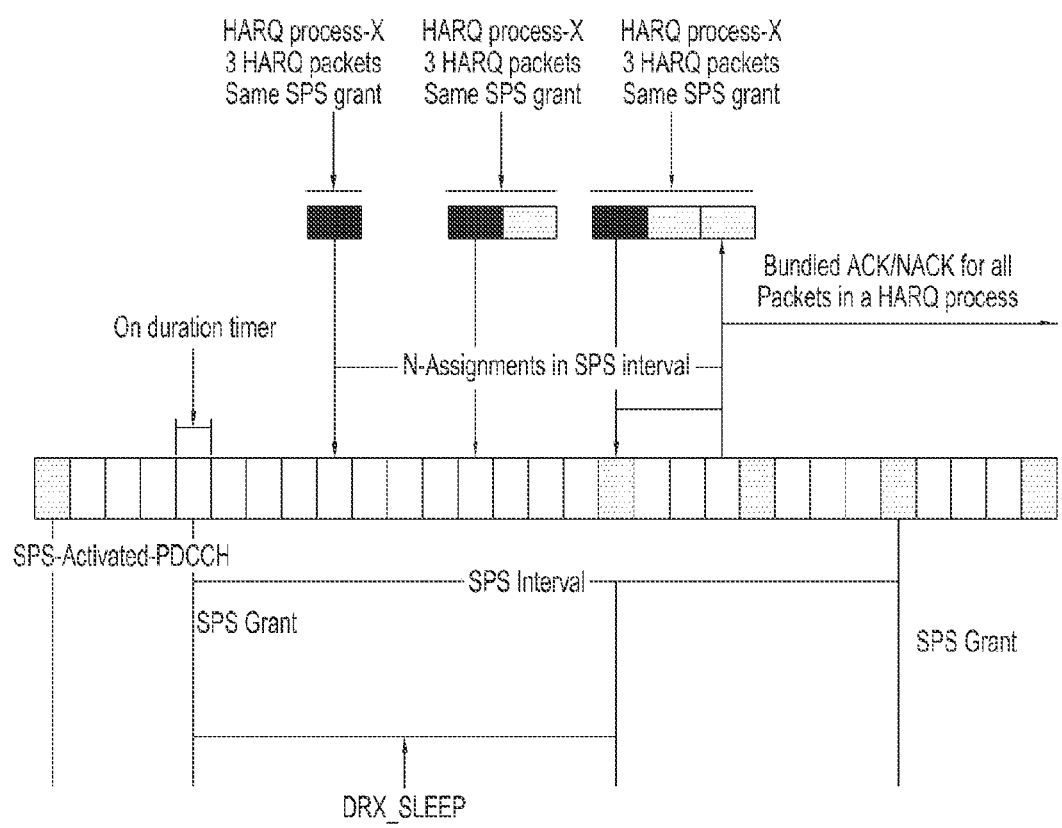
FIG. 5 illustrates a bundled ACK/NACK for a HARQ process for a transmitted redundancy version, according to an embodiment of the present disclosure.

FIG. 5 illustrates a bundled ACK/NACK for a HARQ process for a transmitted redundancy version, according to an embodiment of the present disclosure.

Referring to FIG. 5, a UE is in a connected mode DRX operation and an eNB waits for an on-duration timer and schedules a DL grant assignment in a PDCCH for a HARQ process-x. The eNB may bundle the HARQ packets (e.g., 3) in the HARQ process-x. The UE reads the buffer status and decides to wake up according to the on-duration timer.

Thereafter, the UE determines the buffer status at the on-duration timer at an n-th instance for the SPS grant in the SPS interval. The UE finds the resource block allocation in the PDSCH, after reading the PDCCH.

The UE reads all of the HARQ packets for the HARQ process-x and sends a bundled (aggregated) ACK/NACK for all the read HARQ packets in the HARQ process-x to the eNB.

Accordingly, the DRX is extended for the UE modem and the radio frequency. The eNB waits to receive the ACK/NACK and transmits new HARQ packets or retransmits the HARQ packets, based thereon.

Figure 6:
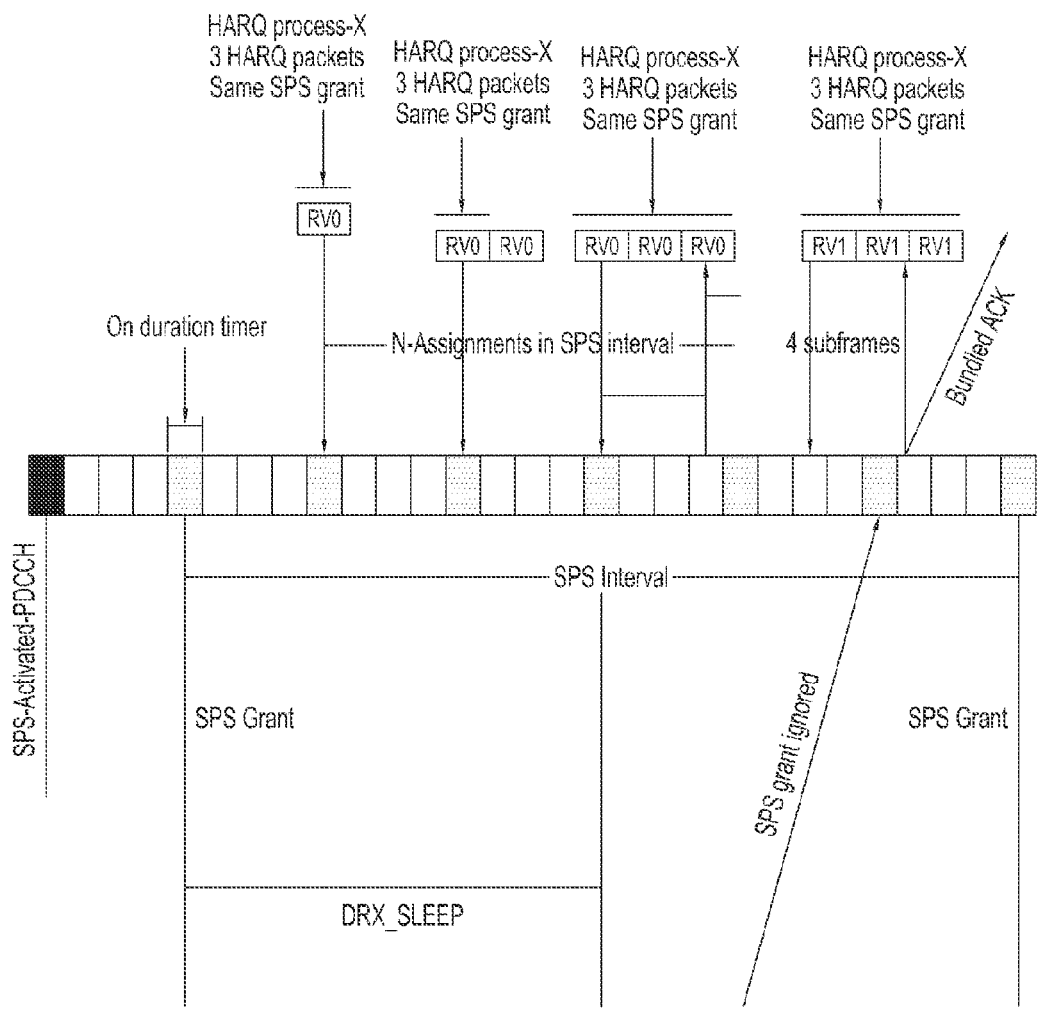
FIG. 6 illustrates re-transmission of a HARQ bundled packet for a HARQ process (i.e., an SPS assignment), according to an embodiment of the present disclosure.

FIG. 6 illustrates a re-transmission of a HARQ bundled packet for a HARQ process (SPS assignment), according to an embodiment of the present disclosure.

Referring to FIG. 6, if an eNB receives an NACK for any packet in a bundle of HARQ packets in a HARQ process-x, the eNB transmits a next redundancy version for all HARQ packets with respect to the HARQ process-x. This method is suboptimal, when the decision has been based on a single NACK in the bundled HARQ packets in the HARQ process-x. However, the NACK in one HARQ packet in the HARQ process-x may result in failure by a UE for decoding other packets of the same HARQ process-x because all HARQ packets in the same SPS grant i.e., a DL scheduling decision, has been based on the same performance metric.

In accordance with an embodiment of the present disclosure, the NACK for the bundled HARQ packet may result in a next redundancy version transmission for all packets in the HARQ process-x. As per the conventional procedure in 3GPP, an eNB transmits NACK packets in N+4 sub frames, after receiving a NACK from the UE. For re-transmission, a Non Adaptive Grant may be given as per current 3GPP procedure. However, for a DL SPS grant assignment during a re-transmission, an SPS grant may be ignored and re-transmission of a Non Adaptive grant may be granted for that re-transmission of the bundled HARQ packet for a given HARQ process-x.

Figure 7:
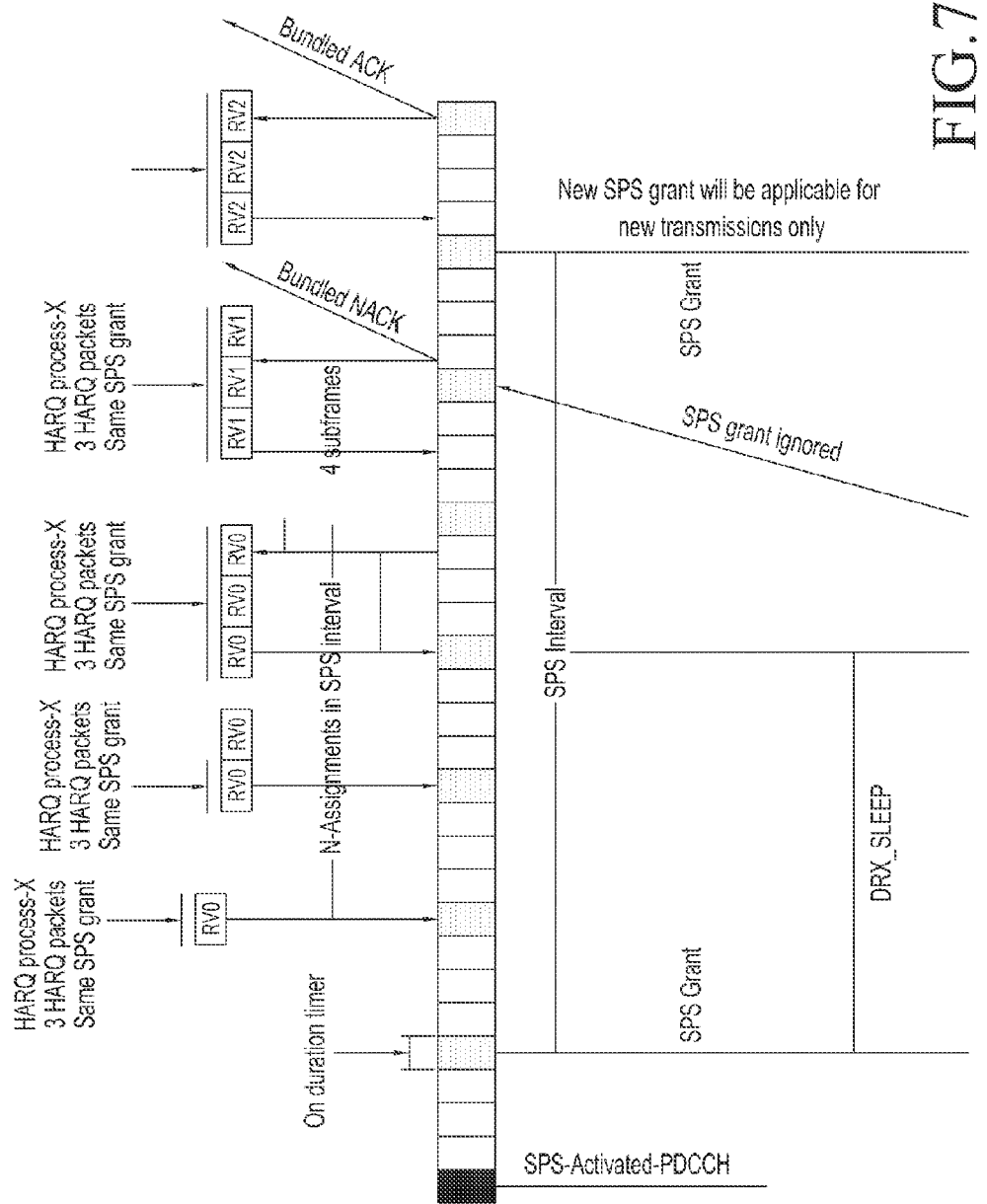
FIG. 7 illustrates a re-transmission of a HARQ bundled packet for a HARQ process (i.e., a new SPS grant after an SPS interval), according to an embodiment of the present disclosure.

FIG. 7 illustrates a re-transmission of a HARQ bundled packet for a HARQ process (a new SPS grant, after an SPS interval), according to an embodiment of the present disclosure.

Referring to FIG. 7, the eNB bundles multiple HARQ packets for a HARQ process-x for a same SPS grant. The mechanism described herein is considered for an SPS grant, so the MCS, the resource allocation, and the spatial parameter may remain the same for all assignments in the SPS grant during the SPS interval. Hence, the mechanism described herein is applicable during the SPS interval.

If a re-transmission of a HARQ packet in a HARQ process-x overlaps an SPS interval end instance, then a new resource allocation, an MCS, and spatial parameters may be applicable only to the new transmission HARQ packets for the HARQ process, as per the new (consecutive) SPS grant. The re-transmission may follow a Non Adaptive grant, as per the 3GPP procedure. The eNB may retransmit the plurality of bundled HARQ packets in a new (consecutive) SPS grant because the end instance of the SPS interval is reached.

Figure 8:
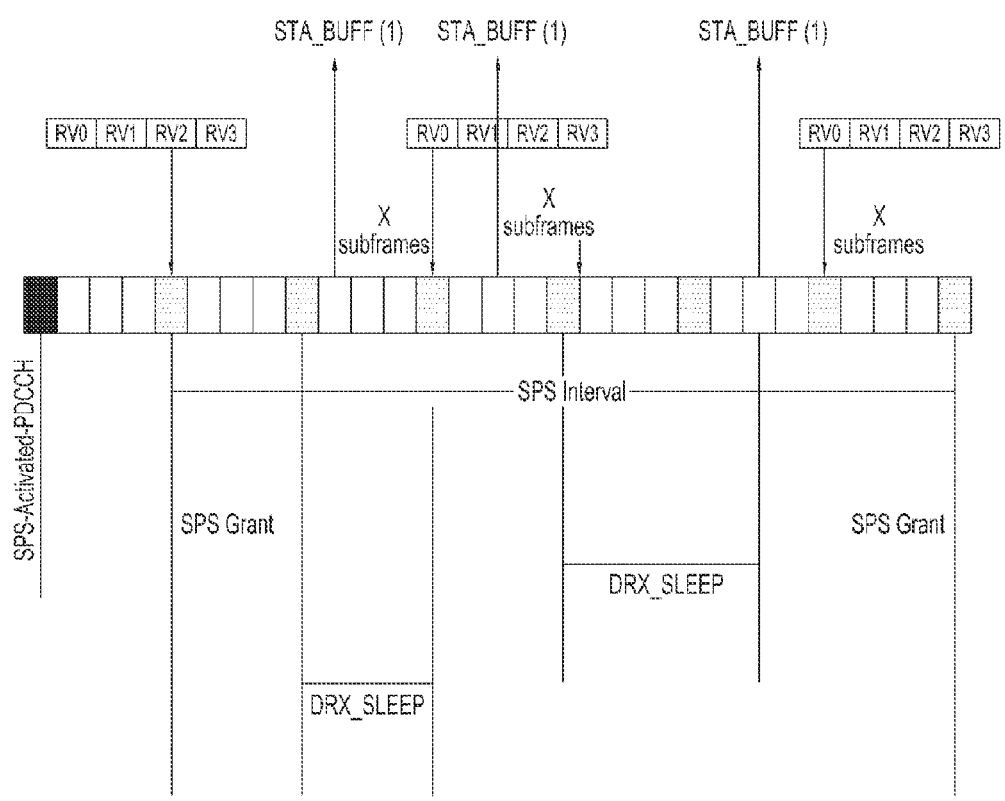
FIG. 8 illustrates a feedback based DL SPS resource assignment for enhancing connected mode DRX sleep, according to an embodiment of the present disclosure.

FIG. 8 illustrates a feedback based DL SPS resource assignment for enhancing connected mode DRX sleep, according to an embodiment of the present disclosure.

Referring to FIG. 8, instead of indicating ACK/NACK, this method re-uses an ACK/NACK bit to indicate a UE jitter buffer status or instantaneous status of the UE to handle a HARQ packet. In accordance with an embodiment of the present disclosure, HARQ is disabled and all redundancy versions are sent together. The method illustrated in FIG. 8 uses redundant spectrum and extends DRX sleep using a current LTE framework. In this case, the UE may not send ACK/NACK to the eNB; instead, the ACK/NACK bit is used to exchange information about the status of the UE to handle the HARQ packet.

Initially, the UE may check the PDCCH during an on duration timer, after a wake up from a connected mode sleep. Based on the SPS grant, the UE may check the PDSCH resources at the assigned sub frames and resources. Further, the eNB may transmit all redundancy versions to the UE on DL SPS assigned resources. As the HARQ is disabled, the eNB may not expect an ACK/NACK from the UE. However, reading of the HARQ packets is still accountable at the UE discretion. In other words, the UE decides whether or not to read the HARQ packets received from the eNB and may read packet information from the HARQ packets based on its requirements or ignore the HARQ packets.

In accordance with an embodiment of the present disclosure, the UE may exchange its capability status, based on the jitter buffer processing limits, with eNB, and may not allow the eNB to transmit the DL HARQ packets. Again, the HARQ is disabled and the ACK/NACK bit does not be used for ACK/NACK indication. However, the ACK/NACK bit is re-used, without hurting the current LTE framework, as STA_BUFF bit, in order to inform the eNB about a binary state of the UE (e.g., 1-ready/0-NOT ready) to receive the packets.

After the UE detects that it has received a maximum number of packets to process without affecting user experience, e.g., the number of packets is equal to a preset threshold, the UE moves to the connected mode DRX sleep and shuts down the modem processor and RF unit. However, an application processor remains active to run a desired user application and sends STA_BUFF(1) to the eNB, which indicates that the eNB should not send any additional downlink packets for given DL SPS assigned resources. Further, the UE can opt to sleep, as per its UE processing capability.

If the UE detects that it completes processing all the DL packets in next "X" sub frames, the UE sends STA_BUFF (1) to the eNB, in order to schedule more downlink packets in a next DL SPS assignment.

Further, the eNB allocates resources to the UE to send STA_BUFF information on the PUCCH, same as current LTE design.

As described above, the method illustrated in FIG. 8 disables HARQ and re-uses the ACK/NACK bit as a STA_BUFF bit to exchange information related to scheduling of data on DL SPS assignment with the eNB.

The eNB should schedule the DL grant in the next SPS instance for a given SPS grant in the SPS interval.

Further, the UE wakes up at the next SPS instance for the given SPS grant or can wake up in the next SPS grant.

After the DL SPS resource assignment is allocated to UE and UE has again received the maximum number of packets to process without affecting user experience, the UE may send STA_BUFF (0), "X" sub frames before next SPS instance for a given SPS grant in SPS interval or before next grant.

As illustrated in FIG. 8, the method enhances UE capability to handle DL buffers and reduces the DL buffer status signaling.

Figure 9:
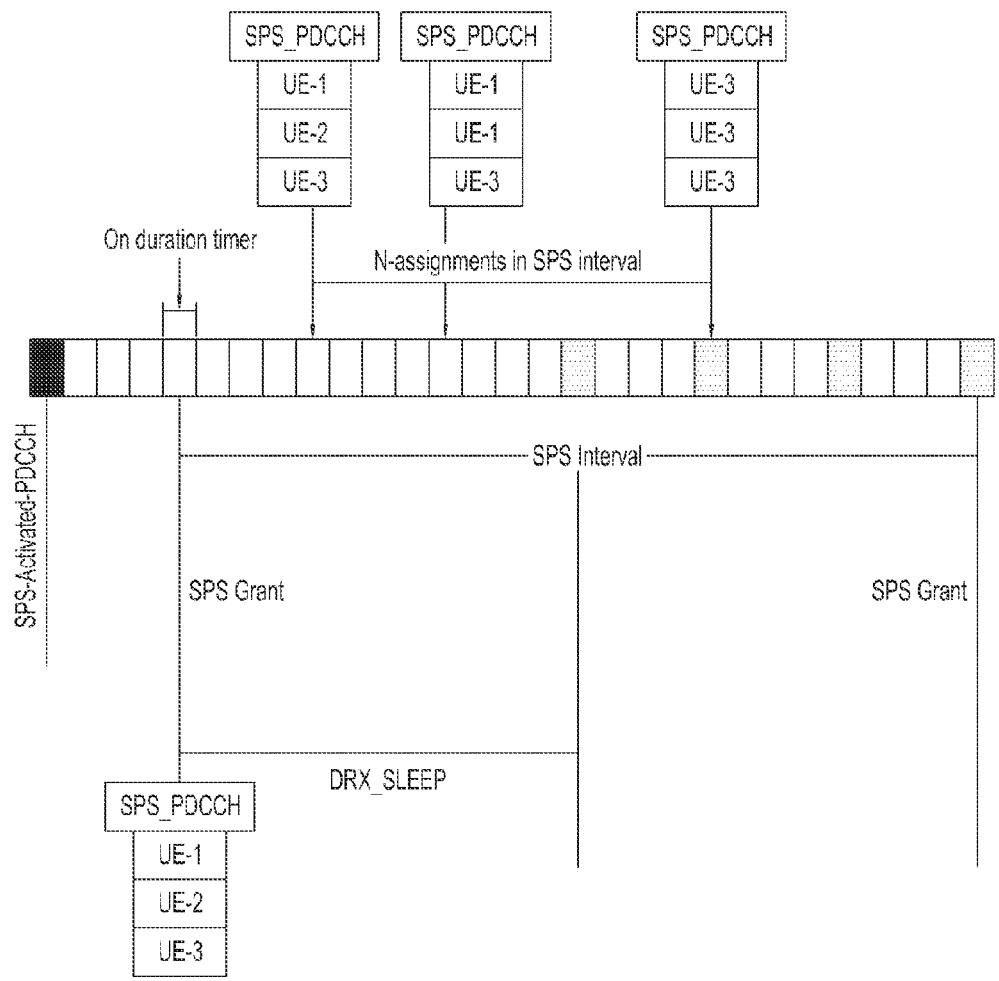
FIG. 9 illustrates a shared SPS radio network temporary identifier (RNTI) based approach for enhancing spectrum utilization, according to an embodiment of the present disclosure.

FIG. 9 illustrates a shared SPS RNTI based approach for enhancing spectrum utilization, according to an embodiment of the present disclosure.

Referring to FIG. 9, in order to minimize spectrum waste during SPS allocation, an SPS grant is shared with a group of UEs. Specifically, a UE is configured to ignore a DL grant and an eNB sends DL packets. The eNB may transmit or retransmit the packets when it receives ACK/NACK for the transmitted packet. The usage of the DL grant is based on the UE capability and channel state information. Hence, in the method illustrated in FIG. 9, the SPS grant can be shared between multiple users, thereby optimizing the SPS grant.

SPS Group allocation is activated or deactivated by the DCI format in the PDCCH. In group SPS group allocation, a resource allocation, spatial parameters, and an MCS are allocated for each UE in the group. Allocation for each UE in the group can be different, so that each UE may occupy different PDSCH space for DL SPS assignment. During each DL SPS assignment, an overall grant for the group remains same.

In accordance with an embodiment of the present disclosure, the SPS grant for each UE can be different, but a summation of all grants cannot be greater than the grant allocated to the whole group for a given MCS and spatial parameter to each UE for the SPS interval. At each assignment based on the UE downlink packet requirement, whether a grant for each UE may be minimized or maximized depends upon the other UE downlink packet requirements.

In order to activate SPS group scheduling, the eNB may allocate a DL SPS grant to a set of UEs, i.e., multiple UEs (UE 1, UE 2, and UE 3 in the FIG. 9), which may share the same SPS grant. An allocated SPS grant for a group of UEs may remain unchanged for the SPS interval and may be followed up with a new DL SPS grant and other control signaling related allocation.

All of the UEs in the group may be allocated an SPS_GROUP_C_RNTI, which remains valid until the deactivation of the group SPS allocation. The SPS grant is allocated in the PDCCH for the group of UEs, where the SPS grant for each UE may be scrambled with SPS_GROUP_C_RNTI. The C-RNTI is an identification of all UE in the group for a given SPS period (until deactivation).

Further, the resource allocation, the MCS, and the spatial parameters for a group and all the UE in the groups are allocated in the DL SPS grant. However, in order to more effectively use the physical resource allocation, SPS grants may keep changing in the resource assignment for a given DL SPS interval. In any assignment in the DL SPS allocation, total resource allocation may remain unchanged. However, allocation can be shared with the UEs, i.e., pre allocated resource blocks can be shared by other UEs in the group, based on the scheduling parameter.

An SPS_PDCCH is required in the DL_SPS allocation, where the UEs in the group can dynamically change the allocation based on the scheduling criteria. The SPS_PDCCH includes resource allocation information for each active UE at that DL SPS assignment. The transmission and re-transmission can continue as per 3GPP LTE, or as per the method illustrated in FIG. 6.

Figure 10:
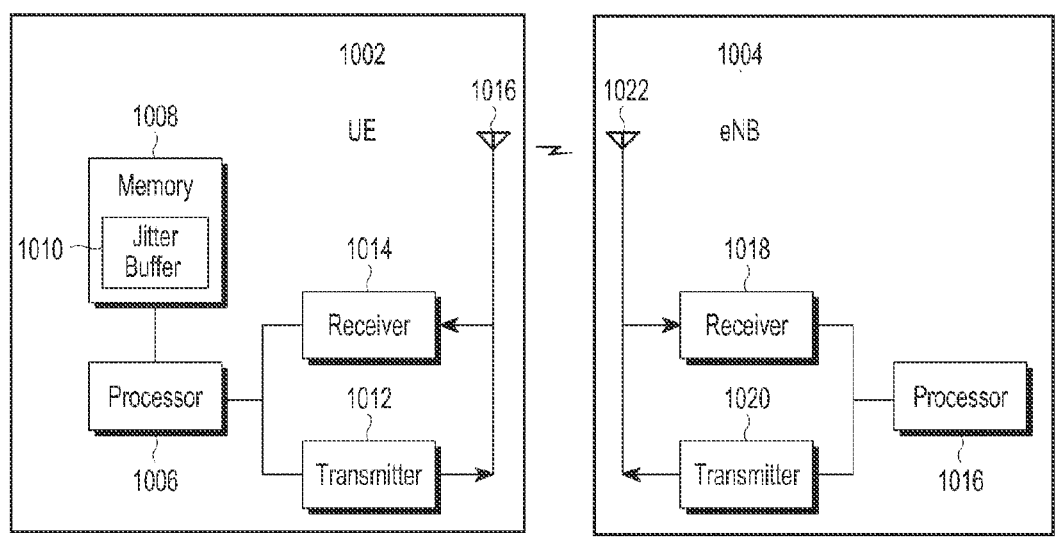
FIG. 10 illustrates a wireless UE and a base station (eNB), according to an embodiment of the present disclosure.

FIG. 10 illustrates a wireless UE and a base station (eNB), according to an embodiment of the present disclosure. Specifically, FIG. 10 illustrates an example of a UE 1002 and a base station 1004 in communication with one another and configured to activate, deactivate, process and/or otherwise to support semi persistent DL scheduling with a HARQ packet bundling to enhance DRX sleep.

In addition to components that may be found in a typical UE, the UE 1002 includes a processor 1006, a memory 1008, a jitter buffer 1010, a transmitter 1012, a receiver 1014, and at least one antenna 1016 to facilitate wireless communication. The processor 1006 is configured to perform a method for activating, deactivating, processing and/or otherwise supporting semi persistent scheduling in a wireless communication system in accordance with the present application. The receiver 1014 and the transmitter 1012 are in communication with the processor 1006. The antenna 1016 is in communication with both the receiver 1014 and the transmitter 1012 to facilitate the transmission and reception of wireless data.

In addition to the components that may be found in a typical base station, the base station 1004 includes a processor 1016, a receiver 1018, a transmitter 1020, and at least one antenna 1022. The processor 1006 is configured to perform a method for activating, deactivating, processing and/or otherwise supporting semi-persistent scheduling in a wireless communication system in accordance with the present application. The receiver 1018 and the transmitter 1020 are in communication with the processor 1006. The antenna 1022 is in communication with both the receiver 1018 and the transmitter 1020 to facilitate the transmission and reception of wireless data.

In addition to signaling using Radio Resource Control (RRC), exemplary methods for signaling and/or supporting semi persistent scheduling including using the Physical Downlink Control Channel (PDCCH) and the Medium Access Control (MAC) Control Element (CE).

For example, PDCCH signaling may be used to supports TTI bundling. The PDCCH may be used to carry downlink control information (DCI) such as scheduling grants, assignments, power-control commands, uplink scheduling grants, resource block allocations/assignments, and HARQ related information. The PDCCH carries multiple DCI formats depending on the type of required control information.

The embodiments disclosed herein can be implemented through at least one software program running on at least one hardware device and performing network management functions to control the elements.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method by a base station for transmitting packets, the method comprising:
   bundling a plurality of packets for a HARQ process in a semi-persistent scheduling (SPS) grant period;
   transmitting, to a user equipment (UE), the bundled plurality of packets for the HARQ process;
   receiving, from the UE, a response to the transmitted bundled plurality of packets; and
   retransmitting, to the UE, the bundled plurality of packets in a next SPS grant period, if the response indicates negative acknowledgement.

2. The method of claim 1, wherein retransmitting the bundled plurality of packets in the next SPS grant period comprises:
   determining whether the SPS grant period is completed;
   wherein retransmitting the bundled plurality of packets in the next SPS grant period comprises retransmitting the bundled plurality of packets in response to determining that the SPS grant period is completed.

3. The method of claim 2, wherein retransmitting the bundled plurality of packets in the next SPS grant period further comprises retransmitting the bundled plurality of packets in the SPS grant period, in response to determining that the SPS grant period is not completed.

4. The method of claim 1, further comprising:
   allocating a downlink SPS grant period to a group of UEs; and
   allocating a plurality of packets to the group of UEs within the downlink SPS grant period.

5. The method of claim 4, wherein the downlink SPS grant period is allocated in an SPS physical downlink control channel (SPS_PDCCH) to the group of UEs.

6. The method of claim 4, wherein the plurality of packets is allocated in an SPS physical downlink control channel (SPS_PDCCH) to the group of UEs.

7. The method of claim 4, wherein the downlink SPS grant period and the plurality of packets for the downlink SPS grant period include a resource allocation, a modulation and coding scheme (MCS), and link parameters for each UE included in the group of UEs.

8. The method of claim 7, wherein the downlink SPS grant period for each included in the group of UEs is different, and
   wherein a summation of the SPS grant periods is less than the SPS grant period allocated to the group of UEs for the MCS and the link parameters for the interval.

9. The method of claim 4, wherein the group of UEs is allocated with a Cell Radio Network Temporary Identifier (C_RNTI), and
   wherein the C_RNTI is valid until the downlink SPS grant period allocated to the group of UEs is deactivated.

10. The method of claim 9, wherein the downlink SPS grant period allocation to the group of UEs and the plurality of packets allocation to the group of UEs is deactivated by a Downlink Control Information (DCI) format in an SPS physical downlink control channel (SPS_PDCCH).

11. The method of claim 1, further comprising:
receiving, from the UE, a buffer status indication that indicates an availability of a buffer of the UE to receive downlink packets in a downlink resource allocation;
determining if the buffer of the is available to receive the downlink packets; and
transmitting the downlink packets in the SPS grant period, in response to determining that the buffer of the UE is available to receive the downlink packets.

12. A method by a user equipment (UE) for receiving packets, the method comprising:
receiving, from a base station, a bundled plurality of packets for a HARQ process in a semi-persistent scheduling (SPS) grant period;
transmitting, to the base station, a response to the bundled plurality of packets;
receiving, from the base station, the bundled plurality of packets in a next SPS grant period, if the response indicates negative acknowledgement.

13. The method of claim 12, further comprising:
generating a buffer status indication that informs the base station to schedule a downlink resource allocation in the SPS grant period; and
transmitting the buffer status indication to the base station.

14. The method of claim 13, wherein the buffer status indication indicates an availability of a buffer of the UE to receive downlink packets in the downlink resource allocation.

15. A chip set configured to:
bundle a plurality of packets for a HARQ process in a semi-persistent scheduling (SPS) grant period;
transmit, to a user equipment (UE), the bundled plurality of packets for the HARQ process;
receive a response to the transmitted bundled plurality of packets; and
retransmit, to the UE, the bundled plurality of packets in a next SPS grant period, if the response indicates negative acknowledgement.

16. The chip set of claim 15, wherein the chip set is further configured to retransmit the bundled plurality of packets in the next SPS grant period by:
determining whether the SPS interval of the SPS grant period is completed;
wherein retransmitting the bundled plurality of packets in the next SPS grant period comprises retransmitting the bundled plurality of packets in response to determining that the SPS grant period is completed.

17. The chip set of claim 16, wherein the chip set is further configured to retransmit the bundled plurality of packets in the next SPS grant period by:
retransmitting the bundled plurality of packets in the SPS grant period, in response to determining that the SPS grant period is not completed.

* * * * *